United States Patent [19]

Marcus et al.

[11] 4,417,764

[45] Nov. 29, 1983

[54] AUTOMOTIVE ARMREST ASSEMBLY

[75] Inventors: Konrad H. Marcus; Sheldon J. Watjer, both of Holland, Mich.

[73] Assignee: Prince Corporation, Holland, Mich.

[21] Appl. No.: 319,689

[22] Filed: Nov. 9, 1981

[51] Int. Cl.³ ............................................. A47C 7/62
[52] U.S. Cl. ..................................... 297/194; 108/44
[58] Field of Search ............... 297/194, 188, 154, 162; 292/251.5; 248/309, 310, 311.1, 311.2, 313, 240.1; 211/1.3; 108/44, 45

[56] References Cited

U.S. PATENT DOCUMENTS

| 1,490,538 | 4/1924 | Owen | 297/194 X |
| 1,869,444 | 8/1932 | Tobey | 297/194 X |
| 1,951,261 | 3/1934 | Thompson | 108/45 X |
| 2,000,916 | 5/1935 | Bloom | 297/194 X |
| 2,453,021 | 11/1948 | Konelsky | 292/251.5 X |
| 2,797,739 | 7/1957 | Orsini | 297/194 |
| 3,051,539 | 8/1962 | Montgomery | 108/44 X |
| 3,338,629 | 8/1967 | Drees | 297/194 |
| 3,637,184 | 1/1972 | O'Brien | 297/194 |
| 3,899,982 | 8/1975 | Fetzek | 108/45 X |
| 4,040,659 | 8/1977 | Arnold | 297/194 |

FOREIGN PATENT DOCUMENTS 72979  3/1946  Norway .......................... 292/251.5

Primary Examiner—William E. Lyddane
Assistant Examiner—Peter A. Aschenbrenner
Attorney, Agent, or Firm—Price, Heneveld, Huizenga & Cooper

[57] ABSTRACT

An armrest for a vehicle, integrally includes a drawer having a holder for different types and sizes of beverage containers. The drawer is releasably secured within a compartment, integral with the armrest, and includes a floor having an aperture therethrough for receiving generally cylindrical objects such as cups. U-shaped legs are pivotally mounted under the floor to be positioned below the apertures to support the bottom of a cylindrical container. In the preferred embodiment the compartment further includes a slide with recesses for holding a writing instrument and writing media such that the slide forms a support for writing on the media.

9 Claims, 9 Drawing Figures

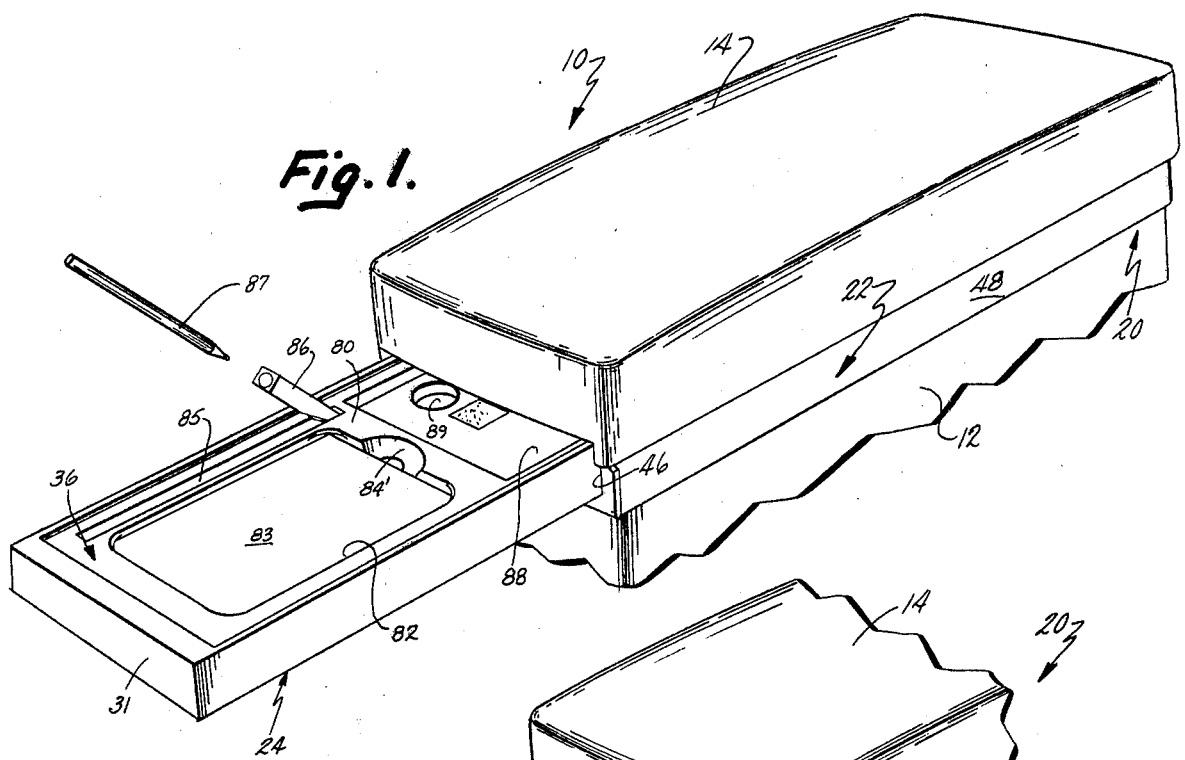
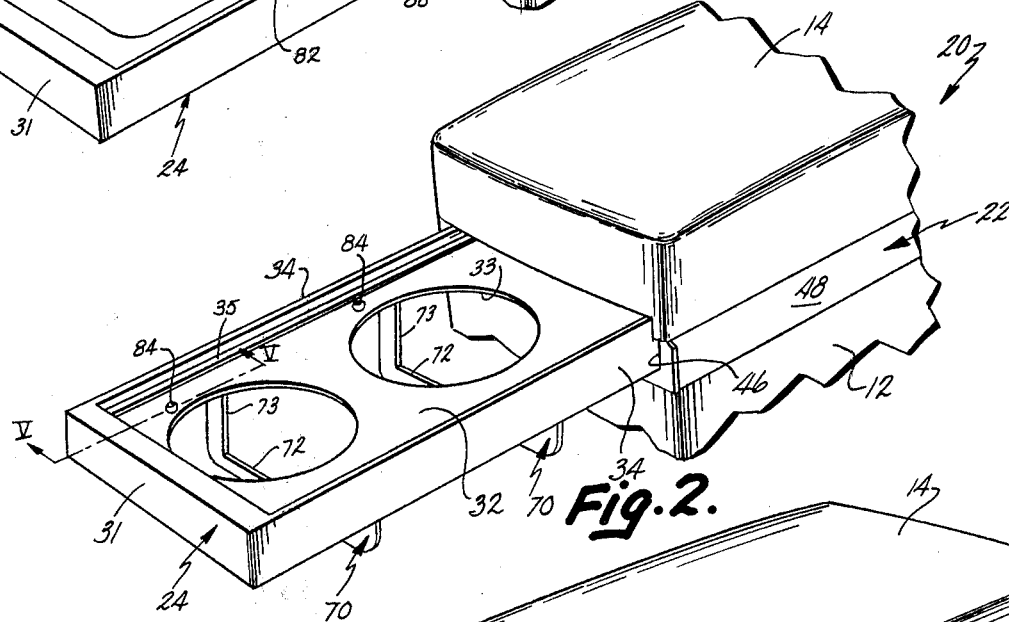
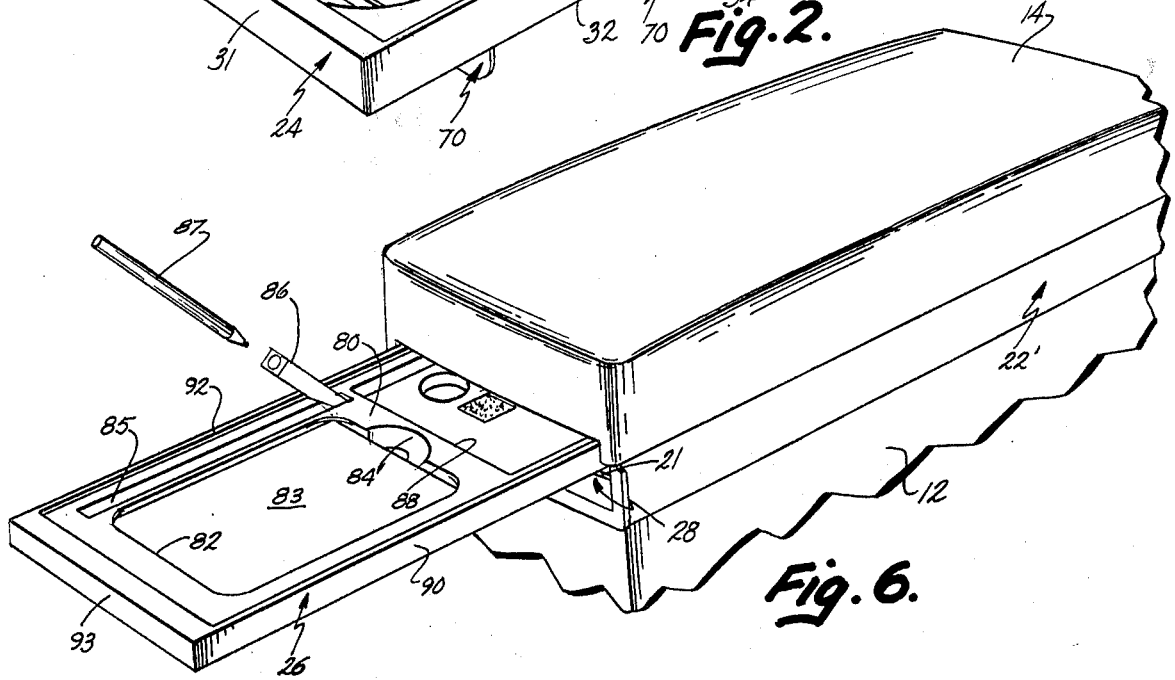

AUTOMOTIVE ARMREST ASSEMBLY

BACKGROUND OF THE INVENTION

The present invention pertains to an automotive accessory and particularly to an armrest with built-in accessories.

With the increasing popularity of fast food restaurants and carry-out stores, frequently occupants of automobiles will eat or drink while in the automobile, either when parked or in motion. There exists a variety of cup holders, for example, integrally formed in the glove compartment door or as accessories for a vehicle. U.S. Pat. No. 4,040,659 suggests a food tray and cup holder for use in connection with the armrest of a vehicle while U.S. Pat. No. 3,606,112 suggests a tray, including cup holders, mounted underneath the dash of a vehicle. A gimballed cup holder for use in connection with the armrest of a passenger seat of an airplane is disclosed in U.S. Pat. No. 3,637,187.

The systems disclosed by this prior art, although providing holders for cups, are somewhat shallow and therefore do not engage and surround the periphery of the cups to provide stable support. They are even less suitable for the holding of other beverage containers such as cans. Further, if the floor of the holder is solid, debris can easily collect therein and be difficult to remove.

SUMMARY OF THE INVENTION

The present invention provides an accessory for use in a vehicle which includes drawer means adapted to be mounted to a vehicle and movable between stored and operative positions. The drawer means includes a floor having an aperture therethrough for receiving generally cylindrical objects such as cups or cans. U-shaped leg means are pivotally mounted under the floor to be positioned below the aperture means and support, for example, the bottom of a can or the like, when necessary.

In the preferred embodiment of the invention a compartment for slideably receiving the drawer means is integrally mounted to an armrest base. The compartment may also include a slide with means for holding a writing instrument and writing media thereon such that the slide forms a support surface for writing on the media. In a preferred embodiment of the invention, the slide with the writing instrument and media is integral with the drawer such that they occupy, substantially, the same volume within the armrest thereby providing a compact, neat appearing armrest when the drawer is in a retracted or stored position.

These and other features, advantages and objects of the present invention will best be understood by reading the following description thereof together with reference to the accompanying drawings in which:

BRIEF DESCRIPTION OF THE DRAWINGS

FIG. 1 is a fragmentary perspective view of one embodiment of the present invention shown in a first position;

FIG. 2 is a fragmentary perspective view of the structure shown in FIG. 1 shown in a second position;

FIG. 6 is a fragmentary perspective view of an alternative embodiment of the present invention;

DETAILED DESCRIPTION OF THE PREFERRED EMBODIMENTS

Figure 7:
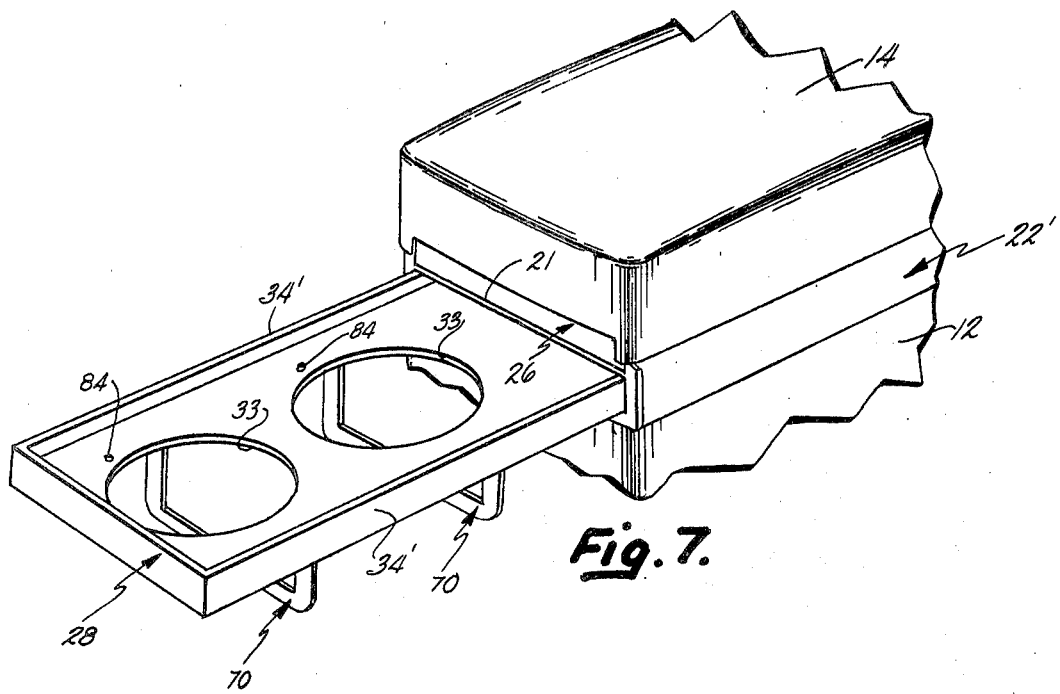
FIG. 7 is a fragmentary perspective view of the alternative embodiment shown in FIG. 6, but shown in a different position.

Referring initially to FIGS. 1 and 2, there is shown an armrest assembly 10 incorporating the present invention. Assembly 10 includes a base 12 which is conventionally secured to the floor of a vehicle and, typically, is located between the two front seats of a vehicle. Supported on top of and secured to base 12 is an accessory assembly 20, of the present invention, over which there is positioned an armrest pad 14 typically including a resilient foam material covered by an upholstery material matching the interior upholstery of the vehicle. In the preferred embodiment of the invention shown in FIGS. 1 and 2, assembly 20 comprises a generally flat rectangular compartment 22 slideably housing a single drawer means 24. In the alternative embodiment, as will be discussed in detail below and as shown in FIGS. 6 and 7, a compartment 22' is provided for a pair of drawer means 26 and 28.

Figure 4:
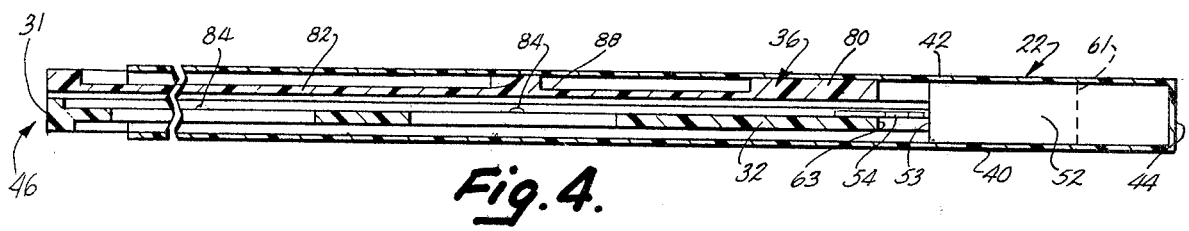
FIG. 4 is a cross-sectional view of the structure shown in FIG. 3 taken along section line IV—IV.

As best seen in FIG. 2, the drawer means of the preferred embodiment of the invention includes a floor 32 with a pair of circular apertures 33 formed therethrough for holding beverage containers, as described in greater detail below. The drawer 24 also includes sidewalls 34 on opposite edges each of which has an inwardly facing longitudinally extending slot 35 for receiving slide means 36, as shown in FIGS. 1 and 4. The slide includes a holder for writing means as well as writing media. Thus, a single drawer assembly 24 can be employed for holding beverage containers when in a position shown in FIG. 2 and when slide 36 is moved to a forward position in the guide and support means consisting of slots 35, can be employed for writing notes or the like. Having briefly described the overall construction of the preferred embodiment of the invention, a detailed description of the assembly 20 follows in conjunction with FIGS. 1 through 5.

Figure 3:
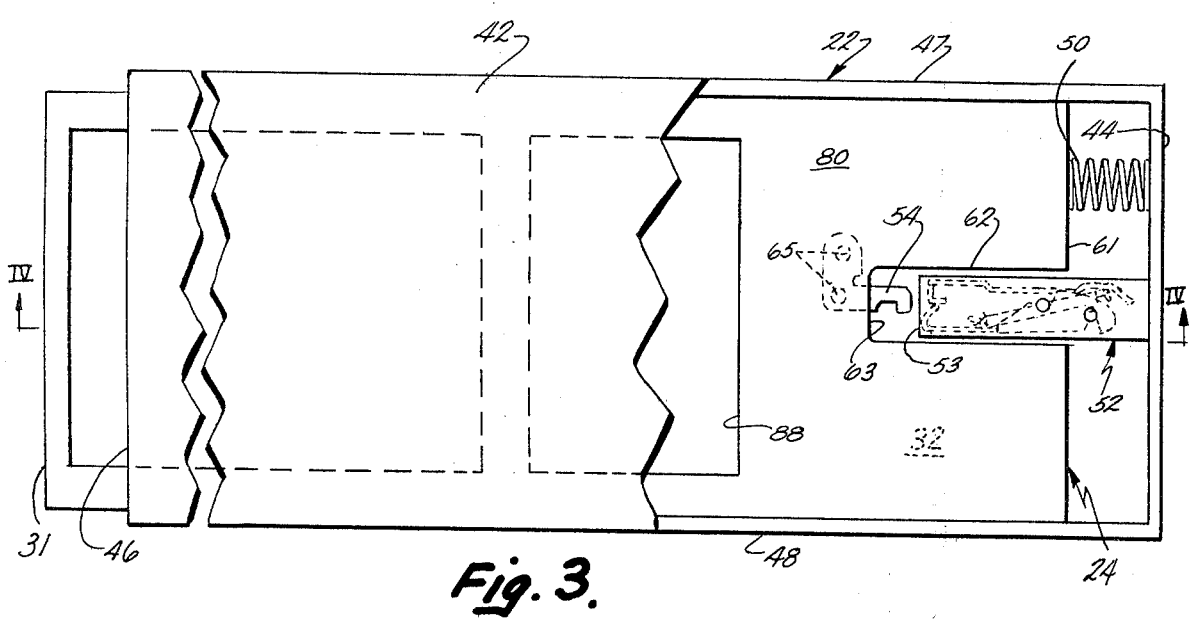
FIG. 3 is an enlarged fragmentary partly broken away top plan view of a portion of the structure shown in FIGS. 1 and 2.

Referring initially to FIGS. 3 and 4, compartment 22 housing the drawer assembly 24 includes a floor 40, a top surface 42, an end wall 44, an open front 46 and left and right sidewalls 47 and 48, respectively, all integrally joined and preferably molded of a lubricious polymeric material such as polycarbonite or the like. The floor 40 of compartment 22 is secured to pedestal base 12 in a conventional manner such as by bonding adhesives or recessed fastening screws which do not interfere with the sliding of drawer assembly 24 within the compartment. Similarly, the top 14 of the armrest assembly is secured to the upper surface 42 of compartment 22 by a bonding adhesive.

The drawer assembly 24 is spring loaded and snap locked into compartment 22 when in a stored position with its leading edge 31 flush with the open front surface 46 of compartment 22. The spring loaded snap lock assembly permits the user to push inwardly on drawer means 24 a short distance which releases catch means 52 allowing a compression spring 50 (FIG. 3), secured to the inside surface of rear wall 44 of compartment 22 and urging against the rear surface 61 of drawer means 24, to urge the drawer means 24 outwardly an inch or two permitting the user to subsequently extend the drawer means as desired. The latching mechanism includes a commercially available UNILATCH latch assembly 52 which releasably captures a latching plate 54 secured to floor 32 of a drawer means 24 by conventional fastening screws 65 as illustrated in FIG. 4. Latch 52 is conventionally secured to the floor 40 and rear wall 44 of the compartment 22. Floor 32 includes a rectangular notch 62 formed therein permitting the drawer to extend into the compartment until plate 54 couples within the spring loaded latch assembly 52 for snap locking and holding the drawer within compartment 22 with spring 50 under compression. In this position, the rear wall 63 of slot 62 will be closely adjacent the forward surface 53 of latch 52.

Drawer means 24 includes a pair of vertical sidewalls 34 which extend a height slightly less than the interior dimension of sidewalls 47 and 48 of the compartment to permit the drawer means to freely slide within the compartment. Similarly, floor 32 has a width such that the outer surface of sidewalls 34 of the drawer means provides sufficient clearance for easy operation of the drawer within the compartment. Floor 32, as best seen in FIG. 4, is spaced slightly above the floor 40 of compartment 22 and is supported on its opposite edges by sidewalls 34 and along the front by lip 31 which extends vertically substantially between upper and lower surfaces 40 and 42, respectively, of the compartment.

Figure 5:
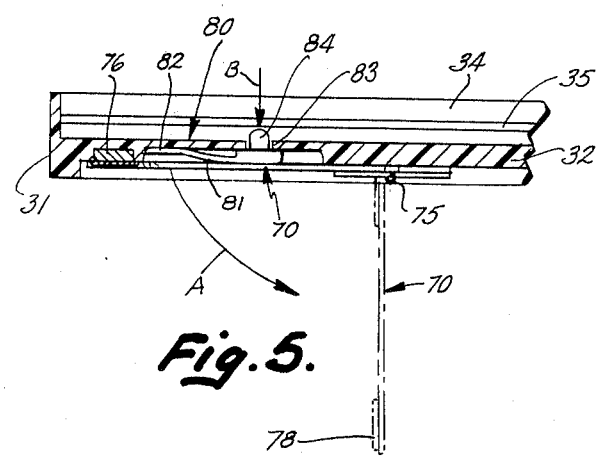
FIG. 5 is an enlarged fragmentary cross-sectional view of a portion of the structure shown in FIG. 2 taken along section line V—V.

Apertures 33 formed through floor 32 of drawer 24 have a diameter to captively engage the outer periphery of standard Polystyrene cups or Styrofoam cups commonly employed for cold and hot beverages. Thus, when inserted in apertures 33 the frusto-conical cups will firmly seat in floor 32 with a circular contact between the cup and floor and with an inch or two of the cup extending above floor 32 permitting removal of the cup. In order to hold cylindrical containers such as cans, pivoted U-shaped legs 70 can be extended from a stored position under and adjacent floor 32 to an operative position as shown in FIG. 2 centrally positioned under each aperture 33. Each leg 70 is generally U-shaped and includes a lower horizontal cross leg 72 and vertically extending side legs 73. Each leg 73 is pivotally coupled at it upper end to the under surface of floor 32 by a hinge 75 (FIG. 5) which is positioned centrally with respect to the aperture 33. As seen in FIG. 5, legs 70 pivot downwardly in a counterclockwise direction as indicated by arrow A from the stored position to provide a lineal contact under the bottom of a can for supporting the same within the holder so formed.

In order to hold the legs 70 in a stored position, embedded within the under surface of floor 32 is a permanent magnet 76 and secured to leg section 70 is a piece of ferromagnetic material 78. As the drawer 24 is moved into the retracted or stored position the open edge of front 46 will force legs 70 upwardly to the stored position in which the magnetic catch so formed will hold the legs. To release the legs, a pivoted plunger assembly 80 is provided. Assembly 80 is made of a resilient polymeric material including an arm 81 anchored at one end 82 to the under surface of floor 32 as seen in FIG. 5. An aperture 83 formed through floor 32 permits plunger 84 at the opposite end of arm 81 to extend therethrough with the undersurface of the plunger engaging the top surface of each of leg 70. By depressing the plunger in the direction indicated by arrow B in FIG. 5, the ferromagnetic material 78 is physically separated from magnet 76 permitting the leg to swing downwardly to the operative position shown in phantom in FIG. 5 and as shown also in FIG. 2. Thus, the can supporting legs 70 can be extended to the operative position only when desired.

Slideably fitted within drawer 24 over the top of floor 32 is slide means 36 which is assembled by sliding the generally flat rectangular plate 80 forming the slide means 86 within rectangular longitudinally extending inwardly facing grooves 35 of the sidewalls 34 from the aft end of drawer 24. Plate 80 includes a forward rectangular recess 82 for receiving a writing media such as memo sheets 83 as seen in FIG. 1. At the aft end of recess 82 there is formed a concave depression 84' permitting easy removal and insertion of memo sheets and permitting the slide to be moved into compartment 22. Adjacent recess 82 there is an elongated rectangular recess 85 for receiving a spring loaded holder 86 for a writing instrument 87, such as a pen or pencil. Holder 86 is pivotally secured to plate 80 in a conventional manner and includes a spring for biasing the holder 86 in an upward 45° angle position as shown in FIG. 1. As the slide or drawer is moved within compartment 22, holder 86 will therefore pivot downwardly into recess 85 as will the writing instrument held thereby. Behind recess 82 there is positioned a second generally rectangular recess 88 for receiving, for example, a flat, credit card size, electronic calculator (not shown) which are commercially available. For removing the calculator, an aperture 89 is provided which is accessable through the rear cup holding aperture 33 such that the calculator can easily be removed from the slide, if desired, by pushing upwardly from under the slide.

In operation, the user can extend the drawer means by pushing inwardly on forward surface 31 thereby releasing the catch at which time spring 50 will urge the drawer outwardly slightly. The drawer can then be pulled forwardly, as shown in FIG. 1, if it is desired to use either the memo pad or calculator. The mounting arrangement permits the vehicle operator to support his forearm on pad 14 while using the slide as a support surface for writing on the memo sheets 83. If the cup or can holder is desired to be used, slide 36 can be slid rearwardly within compartment 22 thereby exposing the cup holding apertures 33, as shown in FIG. 2. If cans are to be hold by the drawer, plungers 84 are depressed to lower the can supporting legs 70. Thus, the system of the present invention provides an integral dual functioning accessory which conveniently is positioned between the passenger and driver of a vehicle such as an automobile in an armrest assembly.

Instead of an integral drawer and slide, the apparatus of the present invention can be made employing a pair of drawers, such as shown in FIGS. 6 through 9. In these figures, structures corresponding to the embodiment of FIGS. 1 through 5 is identified using the same reference numerals.

Figure 8:
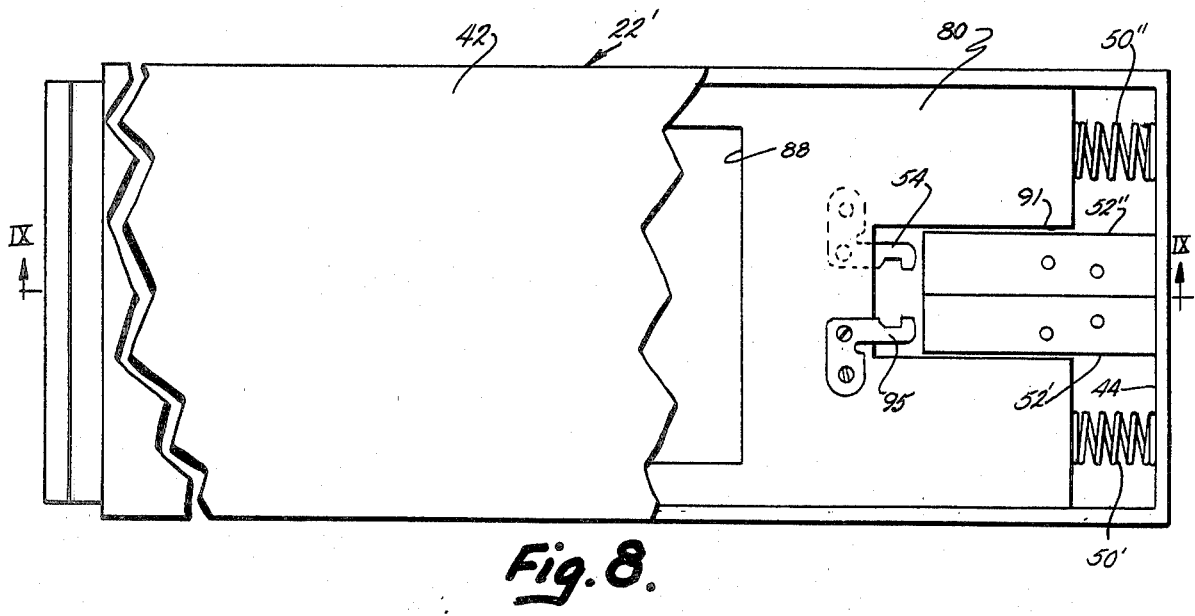
FIG. 8 is an enlarged top plan view of a portion of the structure shown in FIGS. 6 and 7.
Figure 9:
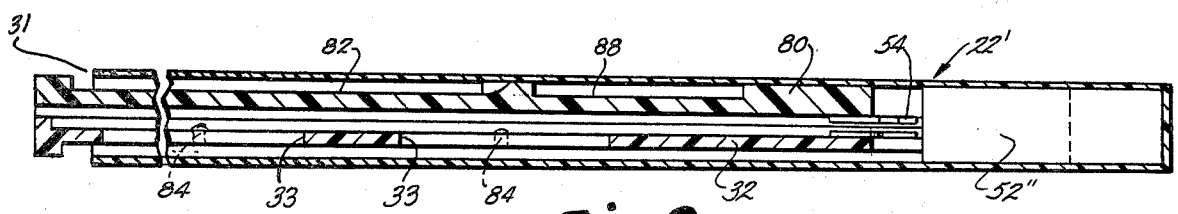
FIG. 9 is a cross-sectional view of the structure shown in FIG. 8 taken along section line IX—IX.

In the FIGS. 6 through 9 embodiment of the invention, a generally rectangular compartment 22' is provided with two rectangular drawer receiving slots separated by a horizontally extending wall 21 (FIG. 7) for receiving drawer assembly 26 (FIG. 6) and a second drawer assembly 28 (FIG. 7). Assembly 26 includes a plate 80 and remaining structure identical to that shown in the FIG. 1 embodiment with the exception that the plate integrally includes longitudinally extending sidewalls 90 and 92 on opposite edges and a front wall 93 to provide support for sliding movement of the plate within the upper slot of compartment of 22'. As seen in FIG. 8, plate 80 includes a generally rectangular slot 91 permitting the slide to clear a UNILATCH latching means 52' secured within compartment 22'. A latching plate 95 is secured to plate 88 for engaging the associated latch 52'. A spring 50', anchored to the rear wall 44 of compartment 22', engages only drawer 26 for providing an initial spring biasing force urging the drawer outwardly from the compartment when initially depressed inwardly thereby releasing the latching mechanism.

Similarly, drawer 28 positioned under drawer or slide 26, includes a slot for clearing its associated UNILATCH 52'' and also includes a latching dog 54. A spring 50'' engages only drawer 28 for urging the drawer initially outwardly once released by the momentary inward depression by the user. The side walls 34' of drawer 28 naturally do not include slots 35 for receiving a slide member since in this embodiment the memo pad slide is an independent structure. Similarly, the sidewalls 34' can be vertically shorter than sidewalls 34 of the integral structure of FIG. 1 such that the overall vertical dimension of the second embodiment is only slightly larger than that of the first embodiment.

It will become apparent to those skilled in the art that various modifications to the embodiments of the invention disclosed herein can be made. Thus, for example, a second unit substantially the same as that of the first or second embodiments can be installed in the armrest and facing rearwardly such that the rear seat passengers also have access to these convenient accessories. These and other modifications to the preferred embodiments of the invention as disclosed herein can be made by those skilled in the art without departing from the spirit or scope of the invention as defined by the appended claims.

The embodiments of the invention in which an exclusive property or privilege is claimed are defined as follows:

1. An armrest assembly comprising:
compartment means adapted to be secured to a vehicle armrest base, and
drawer means slidably mounted to said compartment means for movement between a stored position within said compartment means and an operative position extended from said compartment means; the improvement comprising:
said drawer means having a generally horizontally extending floor with aperture means extending therethrough for admitting and holding a drink container; guide and support means extending from the front to the rear of said drawer means; and
slide means slidably mounted on said guide and support means for providing sliding movement of said slide means to and from a position over said floor, whereby when said drawer is in an extended open position said slide means is slidable with respect to said floor and compartment between a stored position within said compartment means and an operative position over said floor extended from said compartment means, and when said slide means is in said stored position within said compartment said floor is capable of supporting a drink container within said aperture means, said drawer and slide means including means for holding a writing media in a position accessible for use when said slide means is in said operative position.

2. The apparatus as defined in claim 1 and further including generally U-shaped leg means pivotally mounted at the upper ends thereof to said drawer means and movable between a stored position adjacent said floor of said drawer means and an operative position centered generally below said aperture means for engaging and holding the bottom of a cylindrical container positioned in said aperture means.

3. The apparatus as defined in claim 1 wherein said drawer means includes sidewalls extending longitudinally along said drawer means and wherein said guide and support means comprises a groove formed along inner facing surfaces of each of said sidewalls.

4. The apparatus as defined in claim 2 and further including means for releasably holding said U-shaped leg means in said stored position.

5. The apparatus as defined in claim 4 wherein said U-shaped leg means pivot in a direction to be moved from said operative position toward said stored position as said drawer means is moved from said operative position toward said stored position.

6. The apparatus as defined in claim 5 wherein said means for releasably holding said U-shaped leg means in a stored position comprises a magnetic latch having a magnet mounted on one of said drawer or leg means and a ferromagnetic plate mounted on the other of said drawer or leg means.

7. The apparatus as defined in claim 6 wherein said slide means further includes means for holding a writing instrument.

8. The apparatus as defined in claim 1 wherein said compartment includes means for releasably latching said drawer in a stored position.

9. The apparatus as defined in claim 8 and further including bias means for urging said drawer means from said compartment means when released by said latching means.

* * * * *